(12) United States Patent
Chien

(10) Patent No.: US 11,126,518 B1
(45) Date of Patent: Sep. 21, 2021

(54) METHOD AND SYSTEM FOR OPTIMAL BOOT PATH FOR A NETWORK DEVICE

(71) Applicant: Quanta Computer Inc., Taoyuan (TW)

(72) Inventor: Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/820,367

(22) Filed: Mar. 16, 2020

(51) Int. Cl.
*G06F 9/4401* (2018.01)
*G06F 11/22* (2006.01)
*G06F 11/14* (2006.01)
*G06F 11/27* (2006.01)

(52) U.S. Cl.
CPC ........ *G06F 11/2294* (2013.01); *G06F 9/4408* (2013.01); *G06F 9/4416* (2013.01); *G06F 11/1417* (2013.01); *G06F 11/2284* (2013.01); *G06F 11/27* (2013.01)

(58) Field of Classification Search
CPC .............. G06F 11/2294; G06F 9/4416; G06F 11/1417; G06F 11/2284; G06F 11/27
See application file for complete search history.

(56) References Cited

U.S. PATENT DOCUMENTS

| | | | |
|---|---|---|---|
| 9,201,661 B2 | 12/2015 | Lin et al. | |
| 9,507,604 B2 | 11/2016 | Huang et al. | |
| 2012/0124357 A1* | 5/2012 | Zimmer | G06F 8/61 713/2 |
| 2016/0188345 A1* | 6/2016 | Chen | G06F 9/4403 713/2 |
| 2016/0259649 A1* | 9/2016 | Poornachandran | G06F 1/3203 |
| 2017/0176530 A1* | 6/2017 | Cottrell | G01R 31/31719 |
| 2019/0317774 A1* | 10/2019 | Raghav | G06F 9/4406 |

(Continued)

FOREIGN PATENT DOCUMENTS

| TW | 201303636 A | 1/2013 |
|---|---|---|
| TW | 201319942 A | 5/2013 |

(Continued)

OTHER PUBLICATIONS

TW Office Action for Application No. 109122795, dated May 25, 2021, w/ First Office Action Summary.

(Continued)

*Primary Examiner* — Matthew M Kim
*Assistant Examiner* — Kyle Emanuele
(74) *Attorney, Agent, or Firm* — Nixon Peabody LLP

(57) ABSTRACT

A system and method for providing multiple options for booting-up a remote computing device is disclosed. The system has a remote management station, in network communication with a computing device. The computing device has hardware components and a Unified Extensible Firmware Interface (UEFI) basic input output system (BIOS), including multiple power-on self-test (POST) routines. A controller is in communication with the UEFI BIOS and in network communication with the remote management station. The controller receives a selection of one of the plurality of POST routines from the management station. The controller boots up the computing device with the selected POST routine. The POST routines include a normal POST and other specialized routines such as a fast boot option, a safety boot option, a diagnostic boot option and a factory boot option.

21 Claims, 9 Drawing Sheets

(56) References Cited

U.S. PATENT DOCUMENTS

| | | | | |
|---|---|---|---|---|
| 2020/0218544 A1* | 7/2020 | Ganesan | ............... | G06F 9/4406 |
| 2020/0218545 A1* | 7/2020 | Ganesan | ............. | G06F 11/1433 |
| 2020/0225732 A1* | 7/2020 | He | ........................ | G06F 1/3296 |

FOREIGN PATENT DOCUMENTS

| | | | |
|---|---|---|---|
| TW | 201339970 | A | 10/2013 |
| TW | 201416879 | A | 5/2014 |
| TW | 201430705 | A | 8/2014 |
| TW | 201432567 | A | 8/2014 |
| TW | 201510866 | A | 3/2015 |
| TW | 201524150 | A | 6/2015 |
| TW | 201525688 | A | 7/2015 |
| TW | M518365 | U | 3/2016 |
| TW | I553490 | B | 10/2016 |
| TW | 201729123 | A | 8/2017 |
| TW | 201839544 | A | 11/2018 |
| TW | 201839622 | A | 11/2018 |
| TW | 201944239 | A | 11/2019 |

OTHER PUBLICATIONS

TW Search Report for Application No. 109122795, dated May 25, 2021, w/ First Office Action.

* cited by examiner

BIOS Attribute Registry REQ

```
"Name": "BIOS Attribute Registry",
"@odata.context":
"/redfish/v1/$metadata#AttributeRegistry.
    AttributeRegistry",
"RegistryEntries"
```
— 400
— 410

Description

```
{
"HelpText": "Select POST of boot path. NOTE: Your Computer
    will restart in order to change POST of boot path",
"AttributeName": "SETUP023",
"Value": [
    {
    "ValueName": "Normal Boot",
    "ValueDisplayName": "Normal Boot"
    },
    {
    "ValueName": "Fast Boot",
    "ValueDisplayName": "Fast Boot"
    },
    {
    "ValueName": "Safety Boot",
    "ValueDisplayName": "Safety Boot"
    },
    {
    "ValueName": "Factory Provision",
    "ValueDisplayName": "Factory Provision"
    },
    {
    "ValueName": "Hardware Diagnostic",
    "ValueDisplayName": "Hardware Diagnostic"
    }
],
"DisplayName": "POST of Boot Path select",
"DefaultValue": "Normal Boot",
"Type": "Enumeration",
"ReadOnly": false
},
```
— 420

FIG. 4

METHOD AND SYSTEM FOR OPTIMAL BOOT PATH FOR A NETWORK DEVICE

TECHNICAL FIELD

The present disclosure relates generally to boot routines for computing devices. More particularly, aspects of this disclosure relate to a system that includes multiple boot options that bypass selected modules to facilitate rapid booting of a network device.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical chassis structures with attendant power and communication connections. Each rack may hold multiple computing servers and storage servers.

The servers in a data center facilitate many services for businesses, including executing applications, providing virtualization services, and facilitating Internet commerce. As companies place more dependence on these services from data center servers, uptime becomes more critical and valuable. When a server is down, productivity slows down or stops entirely, costing businesses profitability. Although a data center manager may take every precaution to prevent service from being interrupted from faults in the servers, the problem of server downtime is difficult to fully eliminate. The primary causes of server downtime may include server hardware faults, making hardware upgrades, making software upgrades, and accidents from cyberattack or server maintenance. Data center management usually has a plan for coping with server downtime with different contingencies tailored to the cause of the downtime, considering the potentially high and damaging costs of extensive downtime. However, in recovering the servers, each server must be restarted. Each individual server is typically powered-up with a power-on self-test (POST) routine to begin operation. During a POST routine for a computer system, such as a processor core on a server, the basic input output system (BIOS) is executed by the processor core to initialize the hardware of the server. Significant time is expended for the restart process, especially if multiple servers are the subject of downtime due to causes such as software or hardware upgrades.

Thus, there is a need for a system that includes a boot option to eliminate certain unnecessary procedures to speed up the POST routine of the boot path. There is a need for a boot option that allows diagnostics of servers both from in-band and out-of-band. There is also a need for offering different boot options for common scenarios in a data center, factory or service center.

SUMMARY

One disclosed example is a system and method for providing multiple options for booting a remote computing device. The system has a remote management station, a network in communication with the remote management station, and a computing device. The computing device has hardware components and a Unified Extensible Firmware Interface (UEFI) basic input output system (BIOS) including multiple power-on self-test (POST) routines. A controller is in communication with the UEFI BIOS and in network communication with a remote management station. The controller is operable to receive a selection of one of the plurality of POST routines from the management station. The controller is operable to boot-up the computing device with the selected POST routine. The POST routines include a normal POST routine having a security phase; a pre-EFI initialization environment phase to initialize and configure hardware components of the computing device; a driver execution environment phase; a boot device selection phase; and a transient system load phase. The POST routines also include a second, different POST routine.

A further implementation of the example system is an embodiment where the controller is a baseboard management controller. Another implementation is where the computing device is a server. Another implementation is where the management station sends the selection of the POST routine with an in-band communication with the computing device. Another implementation is where the management station sends the selection of the POST routine with an out-of-band communication with the computing device. Another implementation is where the selection is made by a UEFI variable. Another implementation is where the second POST routine is a fast boot that includes bypassing initialization and configuration of at least some of the hardware components of the computing device; and using data structures stored in a persistent memory from the normal POST routine to restore registers of the computing device. Another implementation is where the second POST routine is a safety boot that includes: reading an estimation report of hardware components with faults to determine functional hardware components; disabling the hardware components with faults; and initializing the functional hardware components. Another implementation is where the second POST routine is factory provision boot including: loading a firmware configuration; disabling an error correction mechanism; and performing a stress test on the hardware components. Another implementation is where the second POST routine is a diagnostic option including: collecting debugging messages from safe tests of the computing device; and collecting hardware error status data of the hardware components. Another implementation is where the debugging messages are generated by a JTAG master interfacing with a JTAG scan chain.

Another disclosed example is a method of selecting a boot routine for a computer device. A selection of one of a plurality of power-on self-test (POST) routines is transmitted from a remote management station to a computing device over a network. The computing device includes a controller, hardware components and a Unified Extensible Firmware Interface (UEFI) basic input output system (BIOS) that includes the plurality of POST routines. The selection of one of the plurality of POST routines is received from the management station on the controller. The computing device is booted up with the selected POST routine. The plurality of POST routines includes a normal POST routine. The normal POST routine has a security phase; a pre-EFI initialization environment phase to initialize and configure hardware components of the computing device; a driver execution environment phase; a boot device selection phase; and a transient system load phase. The plurality of POST routines also includes a second, different POST routine.

Another implementation of the example method is where the controller is a baseboard management controller, and the computing device is a server. Another implementation is where the selection of the POST routine is sent with an in-band communication with the computing device. Another implementation is where the selection of the POST routine is sent with an out-of-band communication with the computing device. Another implementation is where the selection is made by setting a UEFI variable. Another implementation is where the second POST routine is a fast boot that includes: bypassing initialization and configuration of at least some of the hardware components of the computing device; and using data structures stored in a persistent memory from the normal POST routine to restore registers of the computing device. Another implementation is where the second POST routine is a safety boot that includes: reading an estimation report of hardware components with faults to determine functional hardware components; disabling the hardware components with faults; and initializing the functional hardware components. Another implementation is where the second POST routine is factory provision boot including: loading a firmware configuration; disabling an error correction mechanism; and performing a stress test on the hardware components. Another implementation is where the second POST routine is a diagnostic option including: collecting debugging messages from safe tests of the computing device; and collecting hardware error status data of the hardware components.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 4 is a table of the Redfish JSON data for the example boot path options, according to certain aspects of the present disclosure;

Figure 1:
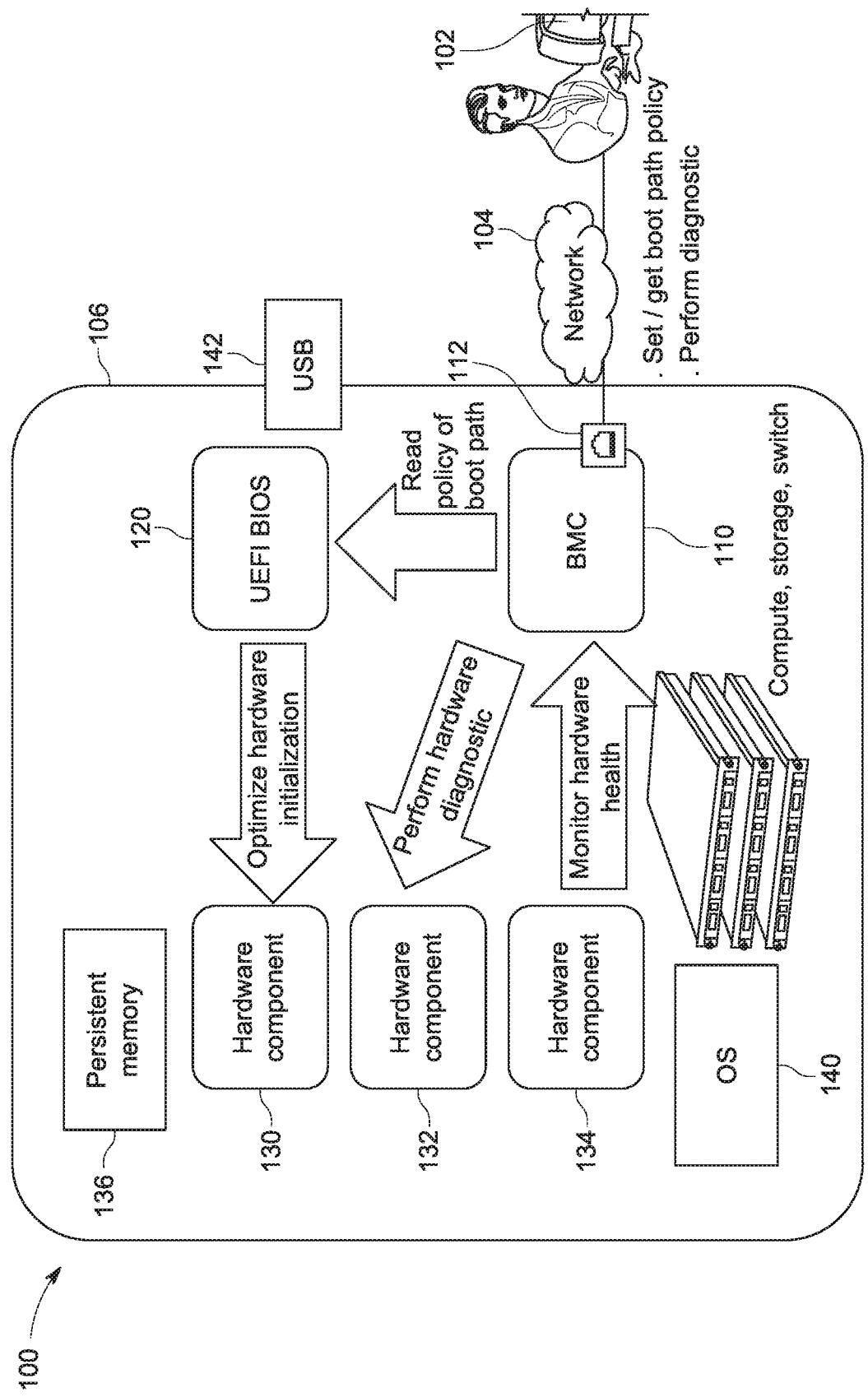
FIG. 1 is a block diagram of a system with an example boot optimization routine, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a system that provides a variety of options for a Power-On Self-Test (POST) routine of the boot path for a server. The variety of options includes options that allow the time for the POST routine to be decreased by bypassing certain initialization steps. The variety of options also includes a diagnostic routine through an out-of-band boot without changing the configuration of the server.

FIG. 1 shows a boot-up system 100 that allows different options of a boot path for a server. The boot-up system 100 includes a remote server management and service station 102 that may be accessed by a data center operator, a network 104, and a remote computing device such as a server 106. The remote server management and service station 102 allows the data center operator to access management interfaces that allow the operator to perform remote diagnostics of the server 106 or set the boot path policy through an out-of-band boot, as will be explained below. The remote server management and service station 102 may generate control signals for the boot path of the server 106 through the network 104.

The server 106 includes a baseboard management controller (BMC) 110. The BMC 110 includes a network interface card or network interface controller 112 that is coupled to the network 104. The BMC 110 is coupled to a boot firmware 120 such as a Unified Extensible Firmware Interface (UEFI) basic input output system (BIOS). The server 106 includes hardware components 130, 132, and 134 that may perform functions such as storage, computing and switching. For example, the hardware component 130 may be a CPU. The other hardware components 132 and 134 may be other processors, memory devices, PCIe device slots, etc. While there are only three hardware components shown in FIG. 1, it is understood that there may be many more hardware components on a typical server. In this example, the server 106 includes a persistent storage 136, such as a flash memory or an I2C EEPROM, that may be divided for different uses such as storing the UEFI BIOS 120.

The BMC 110 reads the policy of the boot path obtained from the remote server management and service station 102. The boot-up firmware 120 optimizes hardware initialization of hardware components of the server 106, such as the hardware components 130, 132, and 134. The BMC 110 may also perform hardware diagnostics of hardware components of the server 106, such as the hardware components 130, 132, and 134. The BMC 110 also monitors the health of hardware components of the server 106, such as the hardware components 130, 132, and 134. Once the POST routine of the boot path is complete, an operating system (OS) 140 begins operation of the server 106. The server 106 also includes a universal serial bus (USB) port 142.

Figure 2:
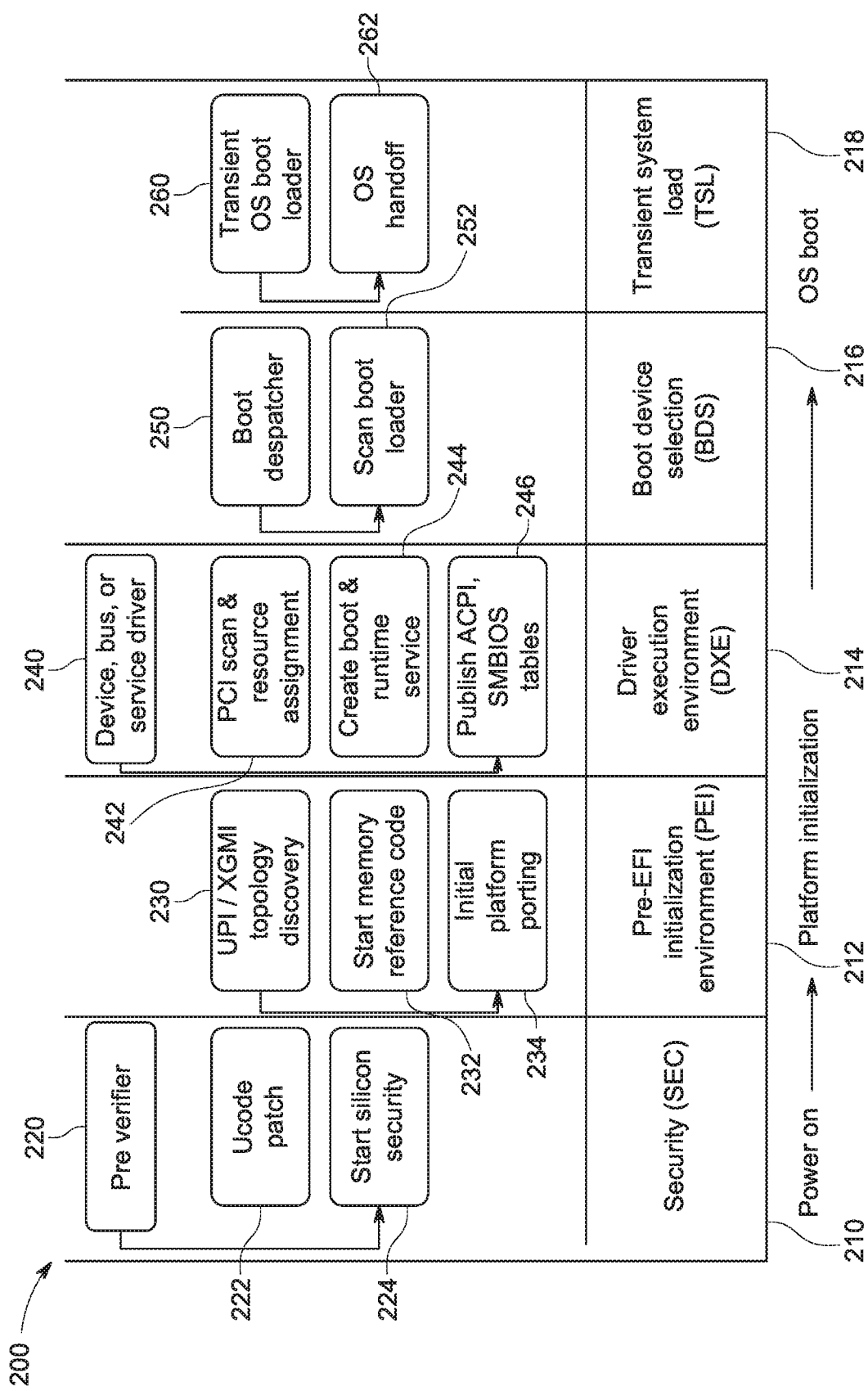
FIG. 2 is a diagram of the different functions that may be accessed by the example different boot paths, according to certain aspects of the present disclosure.

FIG. 2 is a diagram 200 showing the different available functions during the transition from power-on to platform initialization to boot-up that may be optionally implemented according to the boot-up options made available by the example process. The diagram 200 shows different sequential phases of the POST routine of a boot path. Thus, a first column 210 represents a security phase; a second column 212 represents a pre-extensible framework interface (EFI) initialization environment (PEI) phase; a third column 214 represents the driver execution environment (DXE) phase; a fourth column 216 represents a boot device selection (BDS) phase; and a fifth column 218 represents a transient system load (TSL) phase.

The security phase 210 is initiated by a pre-verifier 220 that applies a Ucode patch 222 and starts silicon-based security routines 224. The PEI phase 212 includes a UPI/XGMI topology discovery process 230, a start memory reference code process 232, and an initial platform porting process 234. In this example, the memory reference code process 232 may be bypassed by some of the boot path options.

A set of drivers 240, such as a device driver, bus driver, or service driver implements the DXE phase 214. Each of the drivers sequentially execute until the end of the DXE phase 214. This phase includes a PCI scan and resource assignment process 242, a create boot and runtime service process 244, and a publish ACPI and SMBIOS tables process 246. All of these processes 242, 244, and 246 may be bypassed by some of the boot path options.

The boot device selection phase 216 includes a boot dispatcher process 250 and a scan boot loader process 252. The transient system load (TSL) phase 218 includes a transient operating system boot loader process 260 and an operating system handoff process 262. At the end of the transient system load phase 218, control is handed off to a OS boot loader, such as Linux GRUB, and the operating system 140 boots-up and starts.

The example process offers several options of the POST boot path, each with different POST routines. In the example process the POST boot path options include a normal boot option, a fast boot option, a safety boot option, a factory provision option, and a hardware diagnostic option. These options are operable by in-band implementation through an application accessing the OS 140 on the server 106. The application would allow an operator to select a boot option for the server 106. The options are also available by an out-of-band implementation by a command received from the BMC 110 of the server 106 through the network 104. The fast boot and safety boot options bypass certain of the processes shown in FIG. 2 to increase the speed of the boot operation.

For example, the fast boot option provides the shortest POST time to boot into the operating system (OS) 140 and enables operation of a network device such as the server 106 in FIG. 1. Some of the initialization and configuration of hardware components are bypassed. Settings are restored by the UEFI BIOS 120 if there are no hardware changes on the server 106. For example, if a software patch is added to the OS 140, the server reboot process occurs. The reboot process can skip the unnecessary initialization of the hardware components and restore the hardware settings instead.

In the hardware diagnostic option, the UEFI BIOS 120 and the baseboard management controller (BMC) 110 take responsibility for troubleshooting and reporting information about the server 106 in FIG. 1. In this option, no software configurations or hardware configurations are changed, and thus the diagnostic option has low impact on the data center environment.

Figure 3:
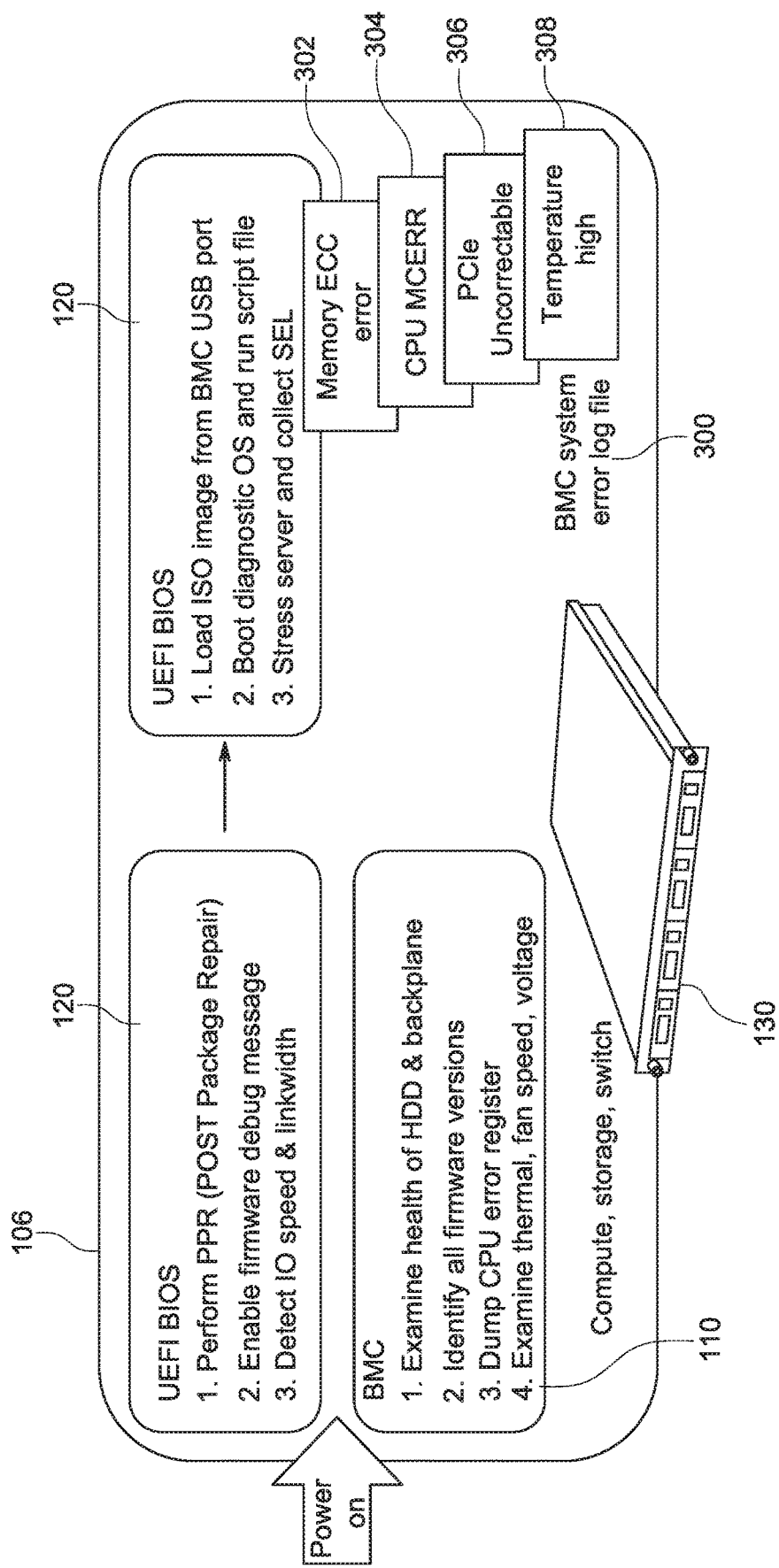
FIG. 3 is a diagram showing the functions of the BMC and UEFI BIOS during an example diagnostic boot-up routine, according to certain aspects of the present disclosure.

FIG. 3 is a diagram of the roles of the components of the example server 106 during the hardware diagnostic boot-up process. When the server 106 is powered on, the UEFI BIOS 120 performs POST package repair, enables firmware debug messages, and detects input/output speed and link width. The BMC 110 examines the health of the hard disk drive and backplane components. The BMC 110 identifies the versions of all firmware on the server 106. The BMC 110 dumps the CPU error register of the server 106. The BMC 110 examines the thermal data, fan speed, and voltage of the server 106.

After powering-on and performing the initial functions described above, the UEFI BIOS 120 loads an ISO image from a USB port accessible to the BMC 110. This is a special feature of the BMC 110 which can emulate the USB port (via a link connect between the host USB port 142 and a BMC port) as a standard USB bootable image. For example, the ISO image can be stored on a USB compatible memory device inserted into the USB port 142. This ISO bootable image can contain embedded Linux OS+debug tools+script file. Thus, the UEFI BIOS 120 can recognize the ISO image as the same as other USB linked bootable devices. The ISO image may be booted from the USB port to perform the script file from the embedded Linux OS. The UEFI BIOS 120 runs the boot diagnostic operating system and runs the script file. The UEFI BIOS 120 stresses the server and collects a BMC system error log file 300. The system error log file 300 may include entries determined by the UEFI BIOS 120, such as a memory error correcting code (ECC) entry 302, a CPU machine check exception (MCERR) error entry 304, a PCIe uncorrectable entry 306, or a temperature high entry 308.

In general, the normal POST routine option of the boot path includes all procedures listed in the diagram 200 in FIG. 2. These procedures must be sequentially processed in the order shown in FIG. 2 until the operating system 140 in FIG. 1 is loaded. The primary purpose of the normal POST routine of the boot path is to initialize the hardware components into a ready state and prepare platform correlated data structures used for the operating system. Initialization of hardware components is a complex procedure. The initialization starts with secure examination, then hardware component detection, and proceeds to setting hardware register programming. The POST of the boot path of the normal option is usually an immovable sequence and large-scale compliance for a variety of hardware components and software requirements. Time spent on implementing boot path depends on quantity of hardware components and the bootable device.

The disclosed example system includes other POST routines of the boot path. These options include the fast boot option, the safety boot option, the factory provision option, and the hardware diagnostic option. These options are controllable through in-band and out-of-band control of the server 106. The in-band control occurs through an interface to the host system of the server 106, while the out-of-band control occurs through the BMC 110 from a remote IPMI interface in communication with a remote device such as the station 102 in FIG. 1. The different POST routines of some of the boot path options speed-up the time frame of a server reboot, and also offer flexible operating choices for operators of a data center, a service station, or a factory.

Thus, the normal boot option is the comprehensive POST boot sequence. The UEFI BIOS firmware 120 in FIG. 1 enables a root of trust secure path; initializes all hardware components of the server 106; creates a bootable device path; and establishes platform correlated data structures prior to the operating system 140 loading. The UEFI BIOS 120 includes the boot options and reads a UEFI variable to execute the selected normal POST routine of the boot path. The normal boot option is a comprehensive POST sequence, except the UEFI BIOS 120 has to complete all necessary hardware initialization and prepare platform information to the OS. In the normal boot option, the UEFI BIOS 120 also saves the required hardware registers content, required UEFI boot elements content, and required OS information content into the persistent storage 136.

The normal boot is performed the first time the server 106 boots up in a data center. The normal boot option is also performed when the data center operator changes hardware configurations or replaces a field replaceable unit of the server 106.

In this example, a UEFI BIOS variable, a BMC variable, and either an OEM IPMI command or a Redfish Attribute-Name of RegistryEntries determine which of the POST routine options of the boot path is selected through either in-band or out-of-band execution. The BMC variable allows the BMC 110 to obtain the boot option from an external device such as the service station 102 in FIG. 1. The UEFI BIOS 120 reads the value of UEFI variable to determine which boot path to execute. The UEFI variable is set either by an OEM IPMI command or a Redfish command from the BMC 110. The Redfish repository (AttributeName of ResiryEntries), has priority and dependency to decide final boot path selection. AttributeName is the name variable and RegistryEntry is the name repository in Redfish. Through these example commands, the server management of a data center and the operating system 140 of the server 106 can directly receive the POST option and then set the POST routine of the boot path. These commands can set the selected boot path on the server 106 until a new POST option of the boot path is issued by the data center operator or through an application on the server 106. Thus, a first example OEM IPMI command REQ is "Get POST of Boot path." This command is a communications protocol between the UEFI BIOS 120 and the BMC 110. The UEFI BIOS 120 uses the command to retrieve the demand issued by the remote data center operator and sets the UEFI BIOS variable for the selected boot option. The set variable is used for retrieving the configuration parameters and returned POST routine of the boot path options. The variable is affected by the result of in-band programming or out-of-band programming commands from the BMC 110. The priority of the get command is mandatory. The NetFN ix 0X30, and the CMD is 0xDA in this example. A second OEM IPMI command REQ is "Set POST of Boot path" that is used for setting the configuration parameters and the POST of Boot Path. The priority for the set command is mandatory. The NetFN is 0X30, and the CMD is 0xDB in this example.

FIG. 4 is a table 400 of the Redfish JSON data for the example boot path options that may be used instead of the OEM IPMI commands. The table 400 includes a BIOS attribute registry request 410 and a corresponding description 420. As may be seen in the description, the value name determines which of the boot paths are used for the POST. The POST routine selected from the normal boot, fast boot, safety boot, factory provision, and diagnostic will depend on the value name selected.

Figure 5:
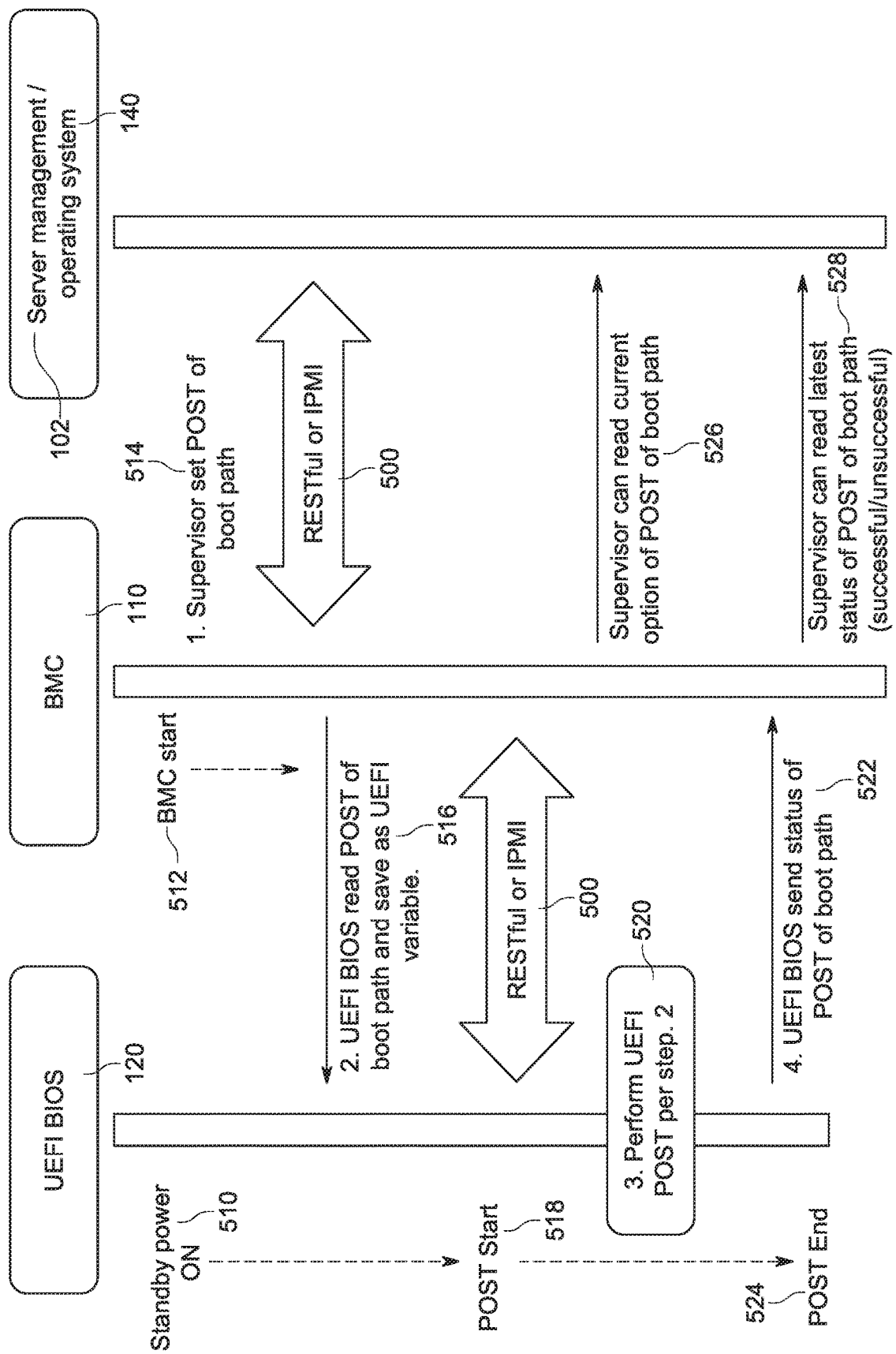
FIG. 5 is a diagram of the communication flow for the POST routine of the boot path that is selected, according to certain aspects of the present disclosure.

FIG. 5 is a diagram of the example communication flow between the UEFI BIOS 120, the BMC 110, and the operating system 140, or the network data center management station 102 for the POST routine of the boot path that is selected. A communication channel, such as a RESTful or IPMI channel 500, may be used as an out-of-band mechanism to exchange commands between the server management station 102 and the BMC 110 and between the BMC 110 and the UEFI BIOS 120. Alternatively, the in-band-mechanism may exchange commands from the operating system 140 to the BMC 110.

The standby power is first turned-on (510). This causes the BMC 110 to be started (512). The operator of the data center sets the POST routine of the selected boot path (514). The setting for the POST routine is communicated to the BMC 110 via the RESTful or IPMI channel 500. The UEFI BIOS 120 reads the POST routine of the selected boot path from the RESTful or IPMI channel 500, and saves it as a UEFI variable (516). The selected POST routine is then started (518). The UEFI BIOS 120 then performs the UEFI POST routine as per the boot path option received from the BMC 110 (520). The UEFI BIOS 120 sends the status of the POST routine of the boot path to the BMC 110 (522). The POST routine then ends (524), allowing the operating system 140 to be started (524). The operator of the data center may read the current option of the POST routine of the boot path (526) through the management and service station 102. The operator of the data center may also read the latest status of the POST routine of the selected boot path (528) through the management and service station 102.

The fast boot option is the most efficient POST boot sequence of the example boot options. In the fast boot option, the UEFI BIOS firmware 120 enables a root of trust secure path; initializes fewer, but significant, hardware components of the server 106; uses data structures replicated during a previous normal boot path to restore hardware registers and legacy memory content; and loads the operating system 140 with a fixed bootable device. If there are no hardware configuration changes, the fast boot option is a more efficient POST sequence than the normal boot option. For the fast boot option, the UEFI BIOS 120 only performs mandatory hardware initialization; restores required content from persistent storage 136 to hardware components; and then loads the operating system from a fixed bootable device. Thus, the UEFI BIOS 120 replicates the hardware component configuration and settings of complex hardware registers into a preserved space of the persistent storage 136. During the fast boot option, the UEFI BIOS 120 reuses this information to program the hardware components instead of performing sequence initialization for the components. Thus, stored settings such as signal timing, PCIe bus link width, and PCIe speed are loaded instead of determining such settings from the hardware components.

The fast boot option is performed when a server reboot occurs in a data center due to the operating system software being upgraded or downgraded. The fast boot is also performed when a server reboot occurs without having any change in hardware configuration. The fast boot option results in about a 30% time saving in the POST routine, in comparison with the normal POST routine.

The safety boot option is a resilient POST boot sequence where the UEFI BIOS firmware 120 reads an estimation report of hard faults of the server 106 from the BMC 110. In the safety boot option, the UEFI BIOS firmware 140 disables hardware components with hard faults automatically; initializes the healthy and functional hardware components of the server 106; creates an available bootable device path; and establishes platform correlation data structures prior to loading the operating system. The server management station 102 of the data center disables the interface to bad and/or malfunctioning hardware components such as a processor (disabling the core socket), memory (disabling the DIMM slot), PCIe IO (disabling the PCIe slot), and onboard device interface or interfaces. The safety boot routine then initializes the rest of the hardware components until it successfully loads the operating system 140.

The primary purpose of the safety boot is resuming on-line status for the server 106. The safety boot option retrieves important business information for data backup and migration for a data center operator when the operating system is loaded after the faulty hardware components are disabled. The safety boot option is performed when a server reboot occurs in a data center due to a hardware fault occurrence. When a hardware fault occurs, the data center operator will often want to retrieve important data back from the server 106 and then repair the faulty hardware components. The safety boot option results in about a 30% time saving in the POST routine, in comparison with the normal POST routine.

The factory provision boot option is a unique POST boot sequence for the UEFI BIOS firmware 120. The factory provision boot option is based on production line requirements to load firmware settings and enable particular hardware configurations for a stress test of the server 106. The factory provision option sequence saves the selection of the POST routine of the boot path to the UEFI BIOS variable, starts initialization, and reads the UEFI variable. The UEFI BIOS 120 then loads the preset firmware configuration automatically. The UEFI BIOS 120 provisions secure feature enabling, and disables the error correction for stress testing for bad hardware component identification and root-out mechanisms. A factory provision boot occurs when the server is booted or rebooted in a production line of a factory. The factory provision boot option results in about a 10% time saving in the POST routine, in comparison with the normal POST routine.

The hardware diagnostic option is a troubleshooting POST boot sequence for both scheduled maintenance in a data center and scheduled maintenance in a service station. The hardware diagnostic sequence saves the selected POST routine of the boot path to the UEFI BIOS variable, starts initialization, and reads the UEFI variable. Because software and hardware changes are forbidden, both the UEFI BIOS 120 and BMC 110 have to perform new and independent diagnostic service routines without touching confidential data and information of the customer. The primary purpose of the hardware diagnostic option is to collect all debugging messages of safe tests; all hardware error status data of the server 106, such as for the processor, PCIe devices, storage peripherals, and IO peripherals; and the runtime system error log of the server 106. The operator of the data center may use this data to perform hardware fault analysis and identify root causes. Thus, the hardware diagnostic option examines hardware health. For example, adjustments of configuration of the user layer of the operating system may be made to install other support feature and software. However, this kind of change may be contrary to the usage model of a data center and raise concerns. Thus, the hardware diagnostic must be performed in the independent operating system environment that does not access the software configuration of the host operating system of the server 106.

In the hardware diagnostic option, the UEFI BIOS 120 enables the maximum debugging level. In the diagnostic option, the UEFI BIOS firmware 120 exposes all levels of debug messages from the POST routine software and hardware initialization to the BMC 110 of the server 106. For example, a memory training error may result in sending the DIMM number of the memory device to the BMC 110 to record. The BMC 110 mounts an ISO image of a run-control library to the server 106 and executes a JTAG master scan engine driver to grab all levels of system error, IO peripheral error, storage error, state of thermal levels, and state of the power supply. The JTAG is an industry standard interface for verifying designs and testing a motherboard. In this example, the hardware components on the server 106 are JTAG supported and thus may be connected with the JTAG master in the BMC 110. This allows the BMC 110 to perform the JTAG command to obtain available data from the corresponding hardware component.

Thus, all POST sequences expose debugging text strings to both the serial console port and the Serial Over LAN (SOL) that connects with the BMC 110. These debugging messages include all sequence service routine names that run in the server 106; the consequence of software data structures that are created during the POST routine; and the signal aspect of interconnections between the device and chipset that are programmed by the UEFI BIOS 120. The UEFI BIOS 120 creates necessary data structures and exposes the data structures to the operating system for platform design recognition. For example, the data structures may be a PCI tree of an ACPI table or a CPU core quantity of the SMBIOS. This data resides in the physical memory after the POST routine is executed. This data is generally only visible to a designer by a specific tool. However, in this example, the UEFI BIOS 120 can clone these contents of the memory and redirect the output through a serial console port and the SOL to remote server management, such as the service station 102. This information may be used for a designer for deeper debugging of the server 106. The same concept may be applied for hardware signal aspects. The UEFI BIOS 120 can micro-adjust the signal intensity through a hardware controller. This data can be output as debugging message accessible remotely by the designer. In the case of a hardware fault occurring, a designer could identify the fault through comparison with the data structures. The BMC 110 mounts an ISO image of the run-control library to the server motherboard USB port 142; emulates the ISO image as a bootable device; then allows the UEFI BIOS 120 to execute the ISO image as an embedded operating system; and performs a diagnostic application.

In this example, the BMC 110 enables a debugging and programming interface, such as a JTAG master, that interfaces with the JTAG scan chain of the main processor of the server 106. The underlying Image Transfer Protocol (ITP) primitives, such as EnterDebugMode, ReadMSR, and WriteIO, are made available within the firmware stack of the BMC 110. Remote applications, such as Python-based C Scripts, may be made available on the remote server management and service station 102. The data center operator may use an application to grab the content of all necessary registers and error status reads such as the Intel At-Scale protocol.

The hardware diagnostic option may be performed when the server 106 is rebooted in a data center for maintenance. The option may also be performed when the server 106 is booted in a service station for analysis. Thus, when a malfunctioning motherboard of a server such as the server 106 is sent to a service station for debugging, the hardware diagnostic option allows a service engineer to quickly ascertain detailed hardware fault information without setting up a complex host diagnostic software environment. Hardware and software changes to the server 106 are forbidden in this diagnostic option. There are no time savings for this option in relation to the normal boot routine.

Flow diagrams in FIGS. 6-9 are representative of example machine readable instructions for the different options for the POST routine boot path in the system 100 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 6-9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 6:
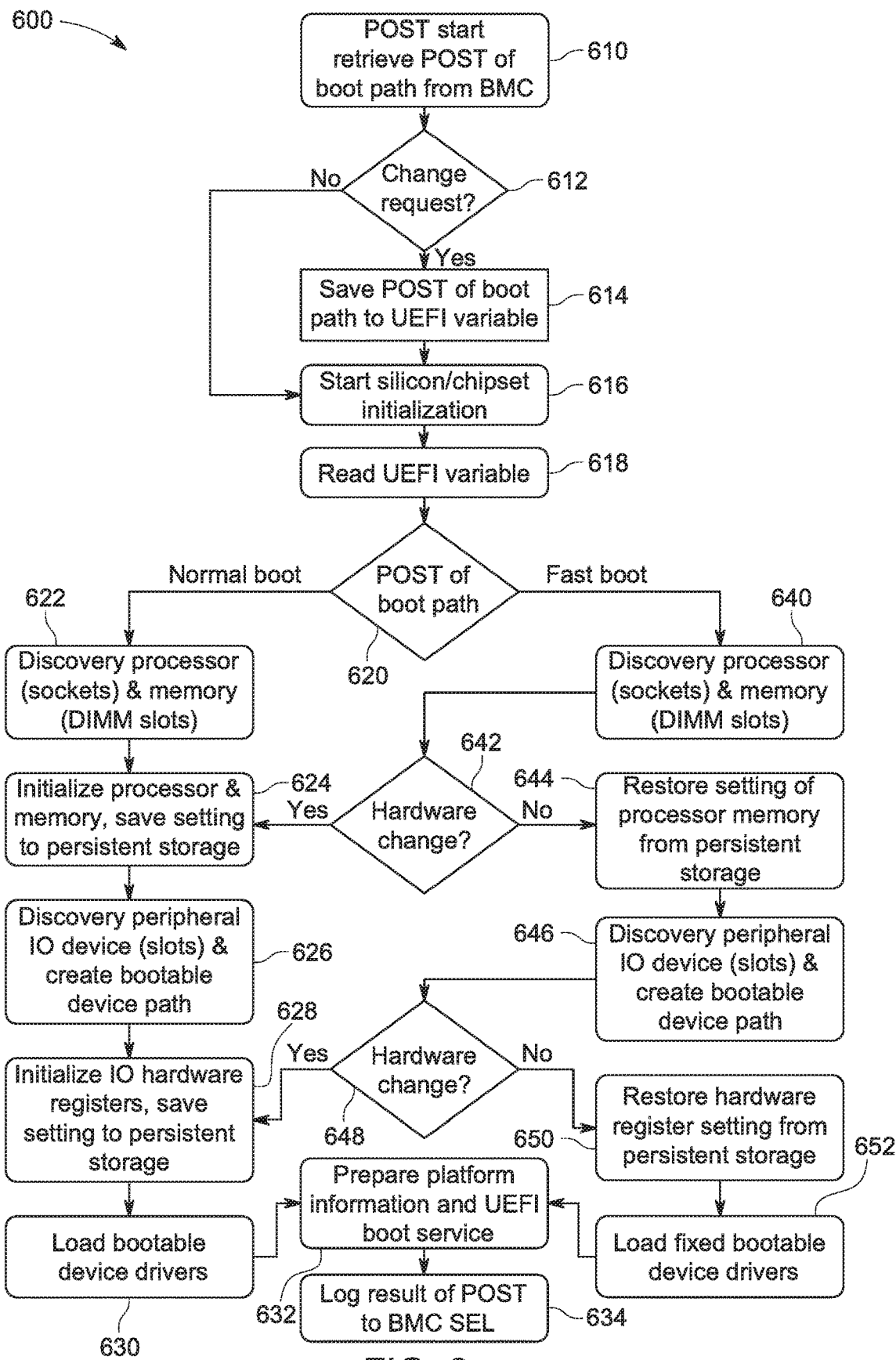
FIG. 6 is a flow diagram of an example normal and fast boot POST routine option, according to certain aspects of the present disclosure.

FIG. 6 shows a flow diagram 600 for the normal boot and fast boot options that may be initiated through the management and service station 102 communication with a remote controller such as a BMC 110 on a server such as the server 106 in FIG. 1. The BMC 110 communicates the selected boot option to a UEFI BIOS such as the UEFI BIOS 120 in FIG. 1. The routine begins with the POST routine start after retrieving the selected POST routine of the boot path from the BMC 110 by the UEFI BIOS setting the UEFI variable (610). The routine first determines whether there is a change request for the boot option (612). If there is a change request, the routine saves the new selection of POST routine options of the boot path to the UEFI variable (614). The routine then starts the initialization of the chip set (616). If there is no change request (612), the routine uses the previously selected boot option and proceeds directly to initializing the chip set (616).

After the chip set is initialized, the routine reads the UEFI boot path variable (618). Based on the value of the variable, the routine determines whether the selected boot path is the normal boot or the fast boot option (620). If the normal boot option is selected, the routine discovers processor sockets and memory sockets (e.g., DIMM slots) on the server 106 (622). The routine then initializes the processor and the memory of the server 106, and saves the settings to persistent storage, such as the storage 136 in FIG. 1 (624). The routine then discovers peripheral IO device slots and creates a bootable device path (626). The routine then initializes IO hardware registers and stores the settings to the persistent storage 136 (628). The routine then loads bootable device drivers (630). The routine then builds the platform information and executes the UEFI boot service (632). The platform information, such as CPU memory and a PCI tree, is built into physical memory for OS loader recognition. The UEFI boot service is used to seek the bootable partition from the hard disk drive and the bootable image from a network drive. The routine then logs the result of the POST routine to the system error log (SEL) maintained by the BMC 110 (634).

If the fast boot option is selected (620), the routine discovers processor sockets and memory sockets (e.g., DIMM slots) on the server 106 (640). Based on the discovered processor and memory hardware interfaces, the routine determines whether a hardware change has occurred (642). If a hardware change has occurred, the routine initializes the processor and the memory of the server 106 and saves the settings to persistent storage such as the storage 136 in FIG. 1 (624). The routine then completes the normal boot sequence described above.

If no hardware change has occurred (642), the setting of the processor memory is restored from the persistent memory 136 (644). The routine then discovers peripheral IO device slots and creates a bootable device path (646). Based on the discovered peripheral device slots, the routine determines whether a peripheral hardware change has occurred (648). If a peripheral hardware change has occurred, the routine initializes IO hardware registers and stores the settings to the persistent storage (628). The routine then completes the normal boot sequence.

If a peripheral hardware change has not occurred (648), the routine restores the hardware register settings from the persistent storage 136 (650). The routine then loads bootable device drivers (650). The routine then performs the platform information and the UEFI boot service (632). The routine then logs the result of the POST routine to the system error log maintained by the BMC (634).

Figure 7:
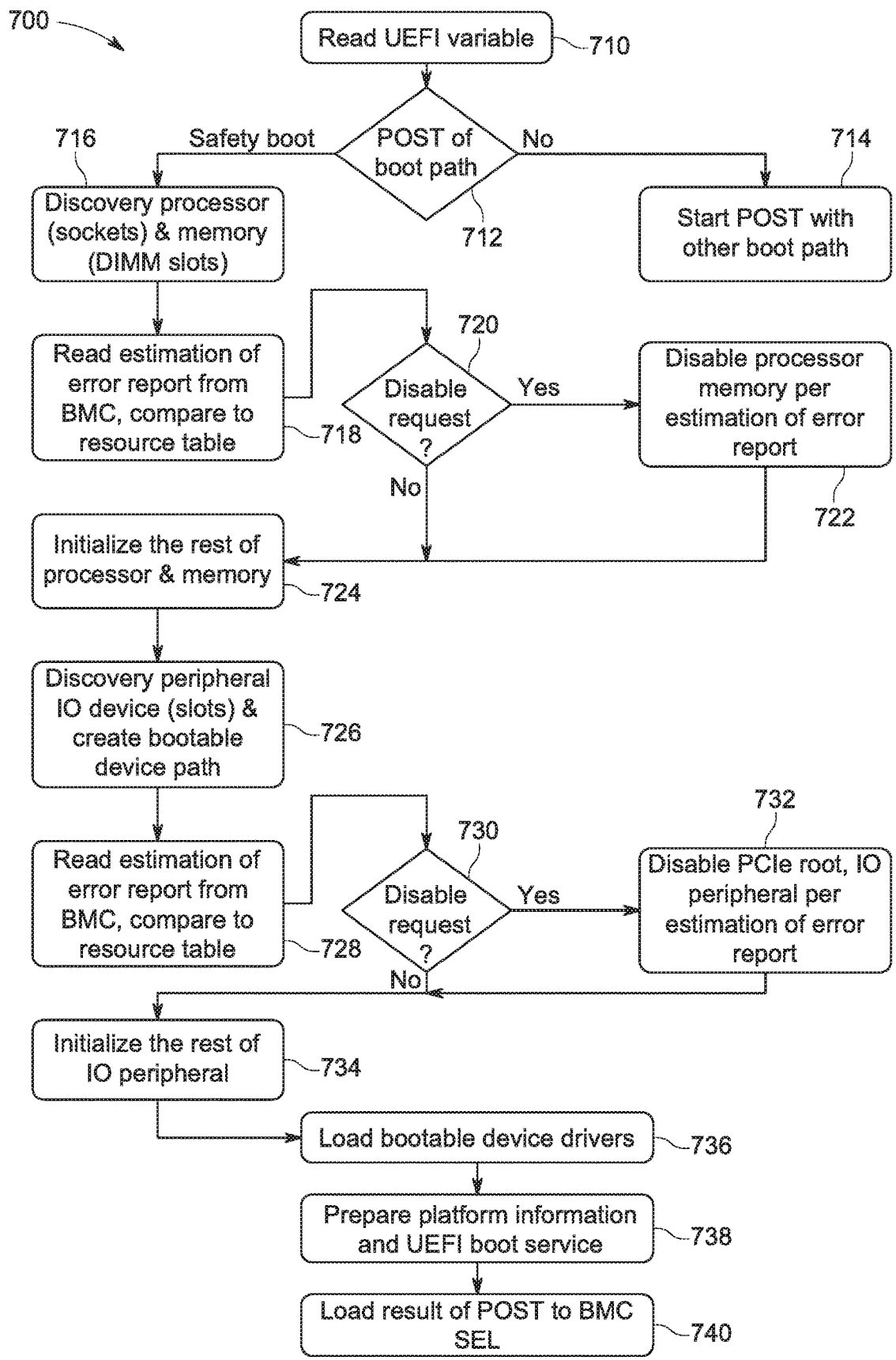
FIG. 7 is a flow diagram of an example safety boot POST routine option, according to certain aspects of the present disclosure.

FIG. 7 shows a flow diagram 700 of the example safety boot option. The safety boot option routine proceeds with the POST routine start after retrieving the POST routine option of the selected boot path from the BMC 110. The routine first determines whether there is a change request for the POST routine similar to the normal boot option in FIG. 6. If there is a change request, the routine saves the new POST routine option of the boot path to the UEFI variable. The routine then starts the initialization of the chip set. If there is no change request (612), the routine proceeds directly to initializing the chip set (610, 612, 614, 616 in FIG. 6).

The routine then reads the UEFI variable (710). Based on the read UEFI variable, the routine determines whether the routine is the safety boot option (712). If the selected option is not the safety boot option, the routine starts the POST routine of another one of the boot options (714). If the safety boot option is selected (712), the routine discovers processor sockets and memory sockets (e.g., DIMM slots) on the server 106 (716). The routine reads the estimation of the error report from the BMC 110 and compares the error report entry to the resource table (718). The resource table is a software data structure that lists the category, ID, and the system resource occupation (e.g., range of memory and IO) for all hardware components. The resource table provides an easy way to compare error report entries of the system error log and identify which hardware components have a higher risk of failure. The higher risk of failure may be determined based on the SEL records showing an uncorrected error occurring numerous times for a particular hardware component. The routine then determines whether a disable request should be made if the existing hardware component has an uncorrected error recorded in the error report entry of the SEL (720). If there is a disable request, the routine disables the hardware component, such as a processor or the memory, in accordance with the estimation of the error report (722). The routine then initializes the rest of the processors and memories (724). If the disable request does not occur, the routine proceeds to initializing the rest of the processors and memories (724).

The routine then reads the estimation of the error report from the BMC 110 in relation to peripheral IO devices, such as a PCIe slot and root controller, and compares it to the resource table (728). The resource table for peripheral devices is a software structure that includes the hardware device information for devices connected to the PCIe slot to allow for enabling or disabling such devices without effecting general function of the root controller. The routine then determines whether a disable request relating to the peripheral IO device should be initiated (730). For example, the routine may decide to initiate a disable request if the hardware device on the resource table has numerous uncorrected errors recorded in the error report entry of the SEL of the BMC 110. If there is a disable request, the routine disables the PCIe root port and the IO peripherals from the estimation of the error report (732). The routine then initializes the rest of the IO peripherals (734). If the disable request does not occur (730), the routine proceeds to initializing the rest of the IO peripherals (734).

The routine then loads the bootable device drivers (736). The routine then prepares platform information and UEFI boot service (738). The routine then logs the result of the POST to the system error log of the BMC 110 (740).

Figure 8:
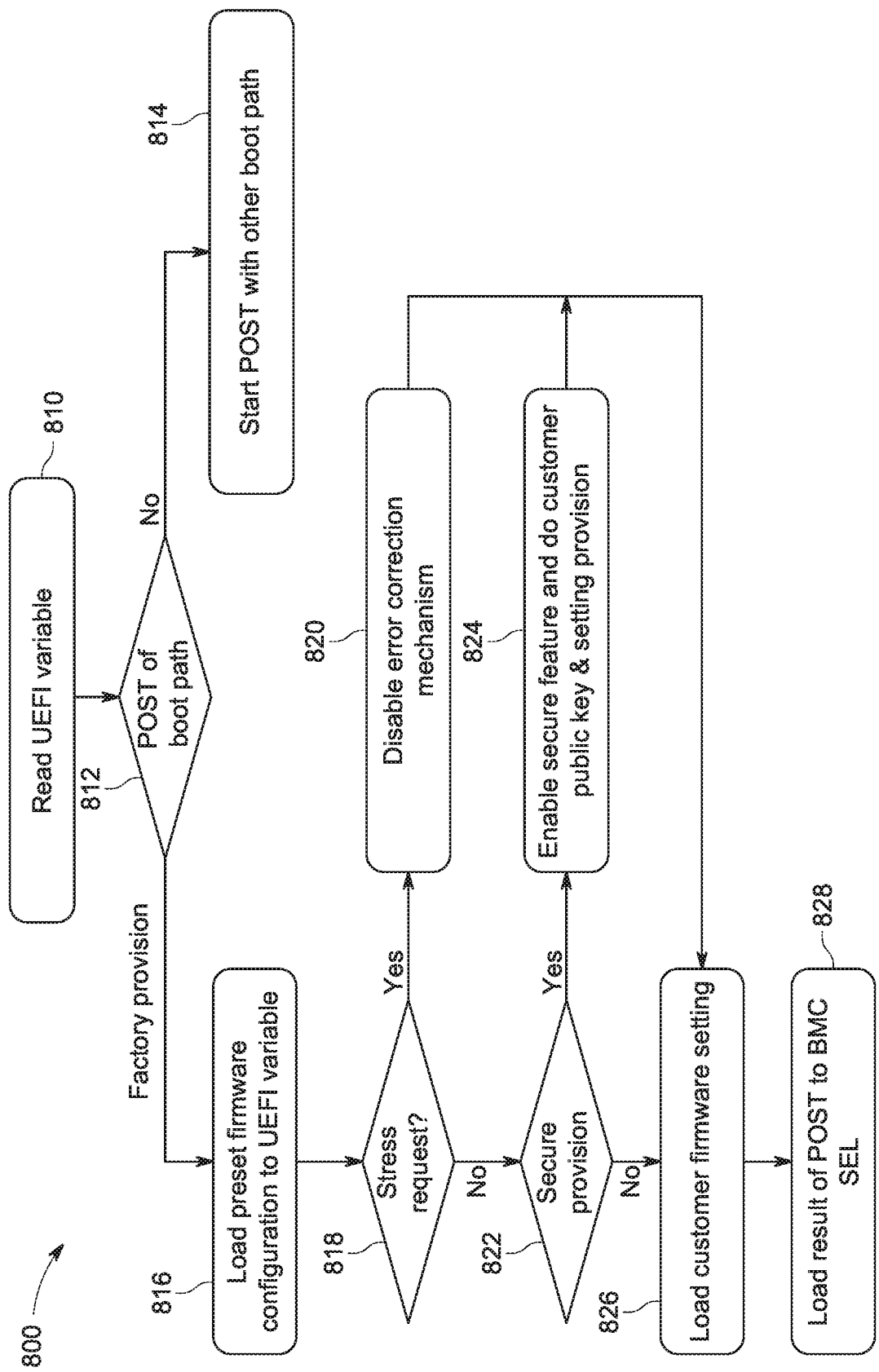
FIG. 8 is a flow diagram of an example factory provision POST routine option, according to certain aspects of the present disclosure.

FIG. 8 is a flow diagram 800 for the factory provision option. The factory provision boot option routine proceeds with the POST start after retrieving the POST of the selected boot path from the BMC 110. The routine first determines whether there is a change request similar to the normal boot option. If there is a change request, the routine saves the POST of the boot path options to the UEFI variable. The routine then starts the initialization of the chip set. If there is no change request (612), the routine proceeds directly to initializing the chip set (610, 612, 614, 616 in FIG. 6).

The routine then reads the UEFI variable (810). Based on the read UEFI variable, the routine determines whether the routine is the factory provision boot option (812). If the selected option is not the factory provision boot option, the routine starts the POST with another one of the boot options (814). If the factory provision boot option is selected (812), the routine loads the present firmware configuration to the UEFI variable (816). The routine determines whether there is a stress request (818). If a stress request is made, the routine disables the error correction mechanism for the system (820). This allows a stress demanding application to be run after the boot-up. The stress demanding application allows a factor operator to identify whether hardware components and commodities of the server 106 are acceptable for shipping. Thus, it is necessary for the UEFI BIOS to open authority of the associated UEFI variable to the factory operator and allow the factory operator to set it to disable the error correction mechanism. If no stress request is made (818), the routine determines whether a secure provision option has been selected (822). The secure provision is another application that may be run after boot-up. The secure provision allows the factory operator to enable security features such as a key provision through a public key and encryption of the hard disk of the server 106 to be enabled.

If a secure provision has been selected, the routine enables the security feature and allows the customer public key and setting provision to be enabled (824). Example security features may include Microsoft bitlocker, Intel TXT, or SGX. A factory operator may also install a public key for the platform and an encryption of the image of the customer on a hard disk. This is one kind of security feature to ensure that the operating system is secure and trusted. A customer may encrypt the host operating system of the server 106 with a private key first. When the UEFI BIOS 120 discovers a bootable operating system with security features enabled, the UEFI BIOS 120 uses the pubic key to decrypt the operating system and hand-off control. Thus, the factory site must install a public key into the server 106 and clone an encrypted image of the customer private key on a hard disk of the server 106. If there is no secure provision or after the error correction mechanism is disabled, or after the security feature is enabled, the routine loads the customer firmware setting (826). The routine then logs the result of the POST to the system error log of the BMC 110 (828). After the routine is complete, the stress test may be performed on the server 106. A stress test may include a stress application, script file and an embedded OS to support the test.

Figure 9:
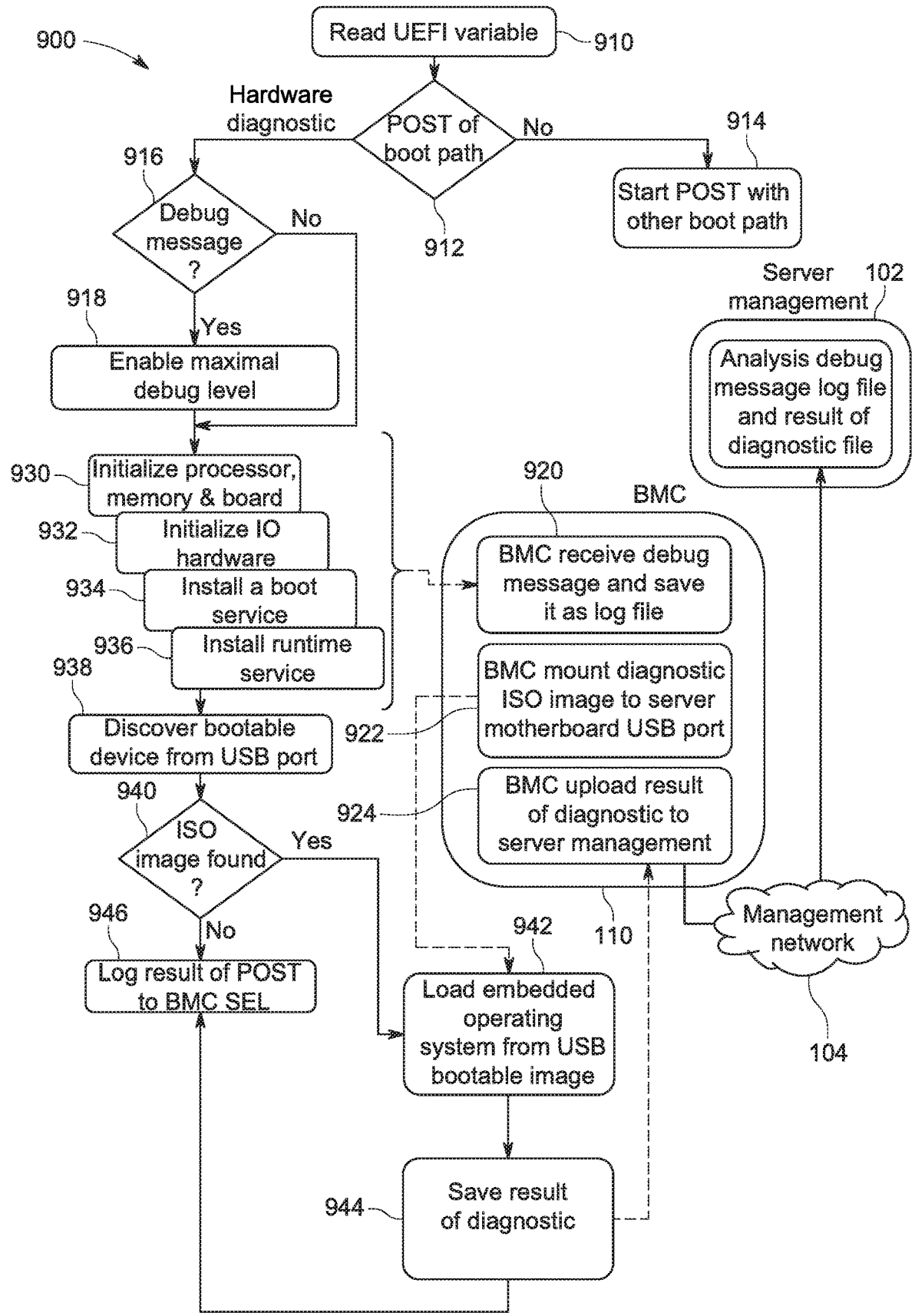
FIG. 9 is a flow diagram of an example diagnostic boot POST routine option, according to certain aspects of the present disclosure.

FIG. 9 is a flow diagram 900 of the diagnostic option. The diagnostic option routine proceeds with the POST start after retrieving the POST of the selected boot path from the BMC 110. The routine first determines whether there is a change request similar to the normal boot option. If there is a change request, the routine saves the POST of the boot path options to the UEFI variable. The routine then starts the initialization of the chip set. If there is no change request (612), the routine proceeds directly to initializing the chip set (610, 612, 614, 616 in FIG. 6).

The routine then reads the UEFI variable (910). Based on the read UEFI variable, the routine determines whether the routine is the diagnostic provision boot option (912). If the selected option is not the diagnostic boot option, the routine starts the POST with another one of the boot options (914). If the diagnostic boot option is selected (912), the routine determines the level of the debug message (916). The debug message level can range from 0 to 3, where 0 is nothing and 3 indicates a maximum debug message output. The level of the debug message is set through a UEFI BIOS variable that may be programmed either in-band or out-of-band. If a debug message is received, the routine enables the maximum debug level (918). Also, if a debug message is received, the UEFI BIOS debugging message is output to the console port and serial over LAN to the BMC 110. The BMC 110 receives the debug message and saves it as a log file (920). The BMC 110 mounts the diagnostic ISO image to the server motherboard USB port (922). The BMC 110 uploads the results of the diagnostic to the management station 102 through the management network 104 (924).

If there is no debug message, or the routine enables the maximum debug level, the routine initializes the processor, memory, and the IO peripheral of the motherboard (930). The routine then initializes the IO hardware (932). The routine then installs the boot service (934). The routine then installs the runtime service (936). The routine then discovers a bootable device such as a memory device with the ISO image from the USB port 142 (938). The routine determines whether an ISO image may be found (940). If the IOS image is found, the embedded operating system is loaded from the USB bootable image that is mounted from the BMC 110 (942). The routine then saves the results of the diagnostic to the BMC 110 (944). If the ISO image is not found, or after the diagnostic results are saved, the routine logs the result of the POST to the system error log of the BMC 110.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system having multiple options for booting a remote computing device, the system comprising:
    a remote management station;
    a network in communication with the remote management station;
    a computing device having hardware components and a Unified Extensible Firmware Interface (UEFI) basic input output system (BIOS) including a plurality of power-on self-test (POST) routines; and
    a controller in communication with the UEFI BIOS and in network communication with the remote management station, wherein the controller is operable to:
    receive a selection of one of the plurality of POST routines from the management station; and
    boot-up the computing device with the selected POST routine, wherein the plurality of POST routines including a normal POST routine having a security phase, a pre-EFI initialization environment phase to initialize and configure hardware components of the computing device, a driver execution environment phase, a boot device selection phase and a transient system load phase, and a second and a third, different POST routine that each result in a faster boot-up of the computing device than the boot-up with the normal POST routine, wherein the second POST routine is a fast boot that bypasses the initialization and configuration of at least some hardware components, and the third POST routine is a safety boot that disables hardware components with faults.

2. The system of claim 1, wherein the controller is a baseboard management controller.

3. The system of claim 1, wherein the computing device is a server.

4. The system of claim 1, wherein the selection of the POST routine is received from an in-band communication.

5. The system of claim 1, wherein the management station sends the selection of the POST routine with an out-of-band communication with the computing device.

6. The system of claim 1, wherein the selection is made by a UEFI variable.

7. The system of claim 1, wherein the fast boot includes:
    using data structures stored in a persistent memory from the normal POST routine to restore registers of the computing device.

8. The system of claim 1, wherein the safety boot includes:
    reading an estimation report of hardware components with faults to determine functional hardware components; and
    initializing the functional hardware components.

9. The system of claim 1, wherein the plurality of POST routines includes a factory provision boot including:
    loading a firmware configuration;
    disabling an error correction mechanism; and
    allowing a stress test to be performed on the hardware components.

10. A system having multiple options for booting a remote computing device, the system comprising:
    a remote management station;
    a network in communication with the remote management station;
    a computing device having hardware components and a Unified Extensible Firmware Interface (UEFI) basic input output system (BIOS) including a plurality of power-on self-test (POST) routines; and a controller in communication with the UEFI BIOS and in network communication with the remote management station, wherein the controller is operable to:

receive a selection of one of the plurality of POST routines from the management station; and boot-up the computing device with the selected POST routine, wherein the plurality of POST routines including a normal POST routine having a security phase, a pre-EFI initialization environment phase to initialize and configure hardware components of the computing device, a driver execution environment phase, a boot device selection phase and a transient system load phase, and a diagnostic option POST routine including:

collecting debugging messages from safe tests of the computing device; and collecting hardware error status data of the hardware components.

11. The system of claim 10, wherein the debugging messages are generated by a JTAG master interfacing with a JTAG scan chain.

12. A method of selecting a boot routine for a computer device, the method comprising:

transmitting a selection of one of a plurality of power-on self-test (POST) routines from a remote management station to a computing device over a network, wherein the computing device includes a controller, hardware components and a Unified Extensible Firmware Interface (UEFI) basic input output system (BIOS) including the plurality of power-on self-test (POST) routines;

receiving the selection of one of the plurality of POST routines from the management station on the controller; and booting up the computing device with the selected POST routine, wherein the plurality of POST routines includes a normal POST routine having a security phase, a pre-EFI initialization environment phase to initialize and configure hardware components of the computing device, a driver execution environment phase, a boot device selection phase and a transient system load phase, and a second, and a third, different POST routine that each result in a faster boot-up of the computing device than the boot-up with the normal POST routine, wherein the second POST routine is a fast boot that bypasses the initialization and configuration of at least some hardware components, and the third POST routine is a safety boot that disables hardware components with faults.

13. The method of claim 12, wherein the controller is a baseboard management controller and the computing device is a server.

14. The method of claim 12, wherein the selection of the POST routine is sent with an in-band communication to the computing device.

15. The method of claim 12, wherein the selection of the POST routine is sent with an out-of-band communication with the computing device.

16. The method of claim 12, wherein the selection is made by setting a UEFI variable.

17. The method of claim 12, wherein the fast boot includes:

using data structures stored in a persistent memory from the normal POST routine to restore registers of the computing device.

18. The method of claim 12, wherein the safety boot includes:

reading an estimation report of hardware components with faults to determine functional hardware components; and initializing the functional hardware components.

19. The method of claim 12, wherein the plurality of POST routines includes a factory provision boot including:

loading a firmware configuration;

disabling an error correction mechanism; and allowing a stress test to be performed on the hardware components.

20. A method of selecting a boot routine for a computer device, the method comprising:

transmitting a selection of one of a plurality of power-on self-test (POST) routines from a remote management station to a computing device over a network, wherein the computing device includes a controller, hardware components and a Unified Extensible Firmware Interface (UEFI) basic input output system (BIOS) including the plurality of power-on self-test (POST) routines;

receiving the selection of one of the plurality of POST routines from the management station on the controller; and booting up the computing device with the selected POST routine, wherein the plurality of POST routines including a normal POST routine having a security phase, a pre-EFI initialization environment phase to initialize and configure hardware components of the computing device, a driver execution environment phase, a boot device selection phase and a transient system load phase, and a diagnostic POST routine option including:

collecting debugging messages from safe tests of the computing device; and collecting hardware error status data of the hardware components.

21. A system having multiple options for booting a remote computing device, the system comprising:

a network interface configured to communicate over a network to a remote management station;

a plurality of hardware components;

a Unified Extensible Firmware Interface (UEFI) basic input output system (BIOS) including a plurality of power-on self-test (POST) routines; and a controller in communication with the UEFI BIOS and in network communication with the remote management station via the network interface, wherein the controller is operable to:

receive a selection of one of the plurality of POST routines from the management station; and boot-up the computing device with the selected POST routine, wherein the plurality of POST routines including a normal POST routine having a security phase, a pre-EFI initialization environment phase to initialize and configure the hardware components, a driver execution environment phase, a boot device selection phase and a transient system load phase, and a second, and a third, different POST routine that each result in a faster boot-up of the computing device than the boot-up with the normal POST routine, wherein the second POST routine is a fast boot that bypasses the initialization and configuration of at least some hardware components, and the third POST routine is a safety boot that disables hardware components with faults.

* * * * *